United States Patent
Barsilai et al.

(10) Patent No.: US 9,800,191 B2
(45) Date of Patent: Oct. 24, 2017

(54) ADAPTIVE LINEAR RESONANCE ACTUATOR CONTROLLER

(71) Applicant: TEXAS INSTRUMENTS INCORPORATED, Dallas, TX (US)

(72) Inventors: Mandy Barsilai, Richardson, TX (US); David Hernandez, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 93 days.

(21) Appl. No.: 14/502,493

(22) Filed: Sep. 30, 2014

(65) Prior Publication Data

US 2015/0137713 A1 May 21, 2015

Related U.S. Application Data

(60) Provisional application No. 61/906,199, filed on Nov. 19, 2013.

(51) Int. Cl.
*H01L 41/09* (2006.01)
*H01L 31/042* (2014.01)
*H02P 25/02* (2016.01)
*H02P 25/06* (2016.01)
*H02P 25/032* (2016.01)
*H02P 6/182* (2016.01)

(52) U.S. Cl.
CPC .......... *H02P 25/027* (2013.01); *H02P 25/032* (2016.02); *H02P 25/06* (2013.01); *H02P 6/182* (2013.01)

(58) Field of Classification Search
CPC ............. H02P 25/02; H02P 7/00; H02P 6/001
See application file for complete search history.

(56) References Cited

U.S. PATENT DOCUMENTS

| | | | |
|---|---|---|---|
| 2010/0064809 A1* | 3/2010 | Toga .................... | G11B 19/042 73/514.34 |
| 2012/0229264 A1* | 9/2012 | Company Bosch .... | G06F 3/016 340/407.1 |
| 2013/0264973 A1* | 10/2013 | Garg ...................... | H02P 6/182 318/130 |

* cited by examiner

*Primary Examiner* — Eduardo Colon Santana
*Assistant Examiner* — Charles S Laughlin
(74) *Attorney, Agent, or Firm* — Michael A. Davis, Jr.; Charles A. Brill; Frank D. Cimino (57) ABSTRACT

A system includes a controller to control movement of a linear resonant actuator (LRA). The system includes a monitor in the controller to monitor a back electromotive force (BEMF) signal from the LRA representing the movement of the LRA. The monitor generates an indicator that indicates whether or not movement of the LRA has occurred. A primary loop module in the controller controls acceleration and braking of the LRA based on the monitored BEMF signal if the indicator from the monitor indicates that LRA movement has occurred. An alternate cycle module in the controller pushes the LRA at a predetermined frequency if the indicator from the monitor indicates that LRA movement has not occurred. The push is employed to move the LRA when the BEMF signal is undetectable by the monitor with respect to a predetermined threshold.

20 Claims, 9 Drawing Sheets

FIG. 11 dr # ADAPTIVE LINEAR RESONANCE ACTUATOR CONTROLLER

CROSS-REFERENCE TO RELATED APPLICATION

This application claims the benefit of U.S. Provisional Patent Application 61/906,199 filed on Nov. 19, 2013, and entitled IMPROVED AUTO-RESONANCE ALGORITHM FOR LINEAR RESONANT ACTUATORS, the entirety of which is incorporated by reference herein.

TECHNICAL FIELD

This disclosure relates to linear resonant actuator (LRA) controllers, and more particularly to a system and method that utilizes a primary loop module to control the LRA in closed loop mode when a back electromotive force (BEMF) signal is detectable and an alternate cycle module to control the LRA in open loop mode when the BEMF signal is undetectable.

BACKGROUND

Linear Resonant Actuators (LRA) are alternating current (AC) motors that are often employed to provide haptic feedback in many modern applications (e.g., provide vibration in a cell phone when the LRA is running). The LRA is very similar to mass loaded spring system. They can be easily modeled as Series RL with a back electromotive force (BEMF) voltage element (calculated based on mechanical properties of the LRA). Generally, the BEMF is proportional to the velocity of the LRA, where velocity is "0" at peak displacements and vice versa (i.e., they are 90° out of phase from each other). Magnetic force generated by the model is proportional to the current flowing though the LRA. Two types of control strategies have developed for controlling movement of the LRA. An open loop controller can drive the LRA independent of the BEMF however these controllers lack the benefit of closed loop controllers that operate at higher efficiency (e.g., less power consumed) and provide higher performance such as higher acceleration and automatic overdrive and braking of the LRA to reduce startup and braking time. Unfortunately, at lower temperatures or under high noise conditions, the BEMF signal may be undetectable by the closed-loop controller and thus, the closed loop controller can fail under such conditions.

SUMMARY

This disclosure relates to a system and method that utilizes a primary loop module to control a linear resonant actuator (LRA) in closed loop mode when a back electromotive force (BEMF) signal is detectable and an alternate cycle module to control the LRA in open loop mode when the BEMF signal is undetectable.

In one example, a system includes a controller to control movement of a linear resonant actuator (LRA). The system includes a monitor in the controller to monitor a back electromotive force (BEMF) signal from the LRA representing the movement of the LRA. The monitor generates a flag that indicates whether or not movement of the LRA has occurred. A primary loop module in the controller controls acceleration and braking of the LRA based on the monitored BEMF signal if the flag from the monitor indicates that LRA movement has occurred. An alternate cycle module in the controller pushes the LRA at a predetermined frequency if the flag from the monitor indicates that LRA movement has not occurred. The push is employed to move the LRA when the BEMF signal is undetectable by the monitor.

In another example, a method includes monitoring a back electromotive force (BEMF) signal from a linear resonant actuator (LRA) representing movement of the LRA. The method includes determining whether or not movement of the LRA has occurred. This includes controlling acceleration and braking of the LRA based on the monitored BEMF signal if it is determined that the LRA movement has occurred. The method includes pushing the LRA at a predetermined frequency if it is determined that that the LRA movement has not occurred. The pushing moves the LRA when the BEMF signal is undetectable with respect to a predetermined threshold for the BEMF signal.

In yet another example, an integrated circuit includes a monitor to monitor a back electromotive force (BEMF) signal from a linear resonant actuator (LRA). The monitor generates an indicator that indicates whether or not movement of the LRA has occurred. A driver generates an output signal to accelerate or brake the LRA. A primary loop module commands the driver to control acceleration and braking of the LRA based on the monitored BEMF signal if the indicator from the monitor indicates that LRA movement has occurred. An alternate cycle module to excite the LRA at a predetermined frequency if the indicator from the monitor indicates that LRA movement has not occurred, wherein the excitation is employed to supply energy that unfreezes the LRA when the BEMF signal is undetectable by the monitor with respect to a predetermined threshold.

DETAILED DESCRIPTION

This disclosure relates to a system and method that utilizes a primary loop module to control a linear resonant actuator (LRA) in closed loop mode when a back electromotive force (BEMF) signal from the LRA is detectable and an alternate cycle module to control the LRA in open loop mode when the BEMF signal is undetectable. Under normal operating conditions, when the LRA is functioning as desired, the BEMF signal can be employed as closed loop feedback in which the primary loop module utilizes to control movement of the LRA. This includes controlling how the LRA accelerates and/or brakes with respect to commands issued from the primary loop module.

Under extreme environmental conditions however, the BEMF signal from the LRA can be degraded and/or undetectable such that close-loop control is no longer possible. For example, under low temperatures the LRA can become frozen such that when initially excited, the LRA does not move and hence, the BEMF signal is not generated. Under high noise conditions in another example, it may not be possible to suitably detect the BEMF signal (e.g., monitor zero crossings with respect to the BEMF). Under such examples where the BEMF cannot be relied upon for closed loop control, the systems and methods described herein can seamlessly switch to open loop control to enable movement of the LRA. In a frozen LRA example, the alternate cycle module can deliver energy excitation pulses in the form of push commands to the LRA at a predetermined frequency such as at or near the resonant frequency of the LRA. The delivered energy can have the effect of unfreezing the LRA and thus allow the LRA's motor action to occur. After movement begins, and the BEMF signal begins to generate, the system can switch back to closed loop operations and re-synchronize with the motion of the LRA at its respective resonant frequency.

Figure 1:
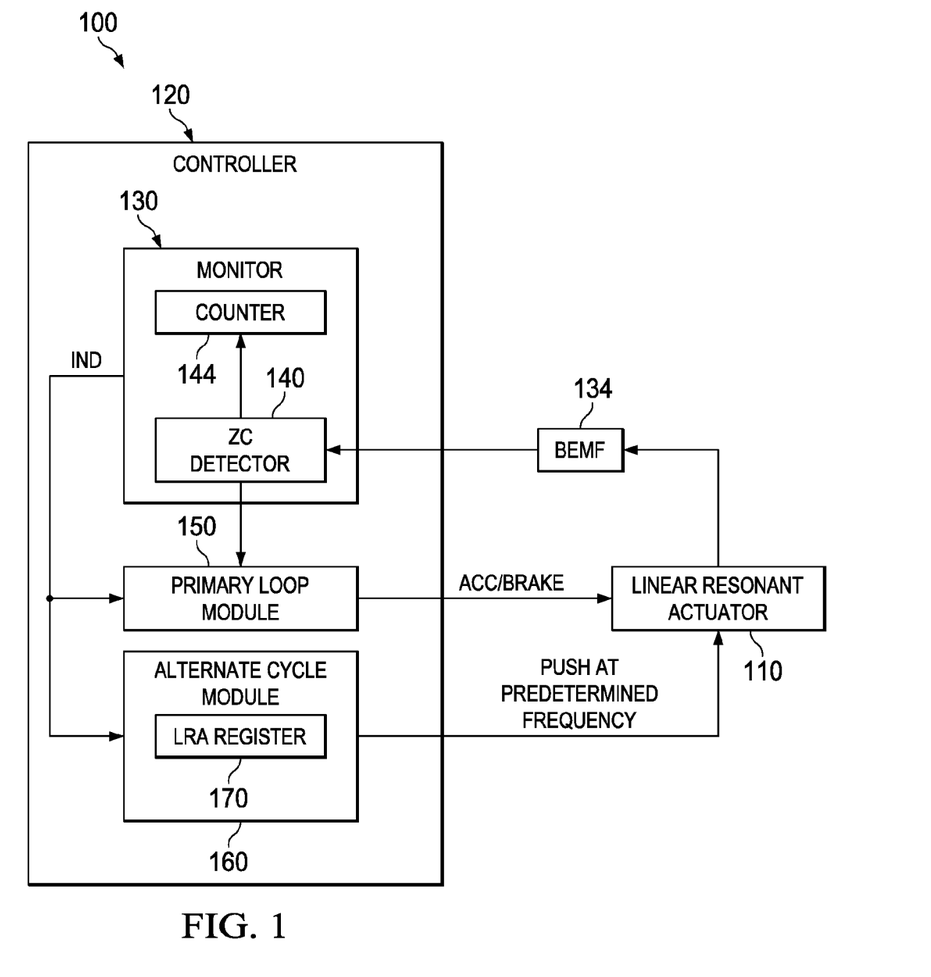
FIG. 1 illustrates an example of a system to control a linear resonant actuator (LRA).

FIG. 1 illustrates an example of a system 100 to control a linear resonant actuator (LRA) 110. The system 100 includes a controller 120 to control movement of the linear resonant actuator (LRA) 110. The system 100 includes a monitor 130 to monitor a back electromotive force (BEMF) signal 134 from the LRA 110 representing the movement of the LRA. The monitor 130 generates an indicator (IND) (e.g., flag, signal) that indicates whether or not movement of the LRA 110 has occurred. Movement can be detected via a detector 140 that determines whether or not the BEMF signal 134 has crossed zero (or a noise threshold near zero—See e.g., FIG. 4). A counter 144 can count the number of attempts to move the LRA 110. Each time a zero cross event has been missed by the detector 140 the counter 144 can be incremented. If LRA movement is detected by the detector 140 (e.g., zero cross event detected), the flag can be set for movement detected. If the counter 144 has reached a predetermined threshold indicating no zero crossing events are detected (e.g., 5, 6, 7), the flag can be set that no movement of the LRA 110 has occurred.

A primary loop module 150 in the controller 120 controls acceleration and braking of the LRA 110 based on the monitored BEMF signal 134 if the flag from the monitor 130 indicates that LRA movement has occurred. An alternate cycle module 160 in the controller 120 pushes the LRA 110 at a predetermined frequency if the flag from the monitor 130 indicates that LRA movement has not occurred. The push is employed to move the LRA 110 when the BEMF signal 134 is undetectable by the monitor 130 (e.g., counter above predetermined threshold value). As used herein, the term push refers to an excitation force applied to the LRA 110 causing it to move toward its resonant frequency.

Acceleration refers to pushing the LRA 110 (e.g., sympathetic to spring motion of LRA) such that the LRA moves to its resonant frequency as fast as possible. Braking refers to pushing the LRA 110 (e.g., against spring motion) such that the LRA stops its movement as fast as possible. During closed loop operations, the primary loop module 150 issues acceleration and braking commands based on the needs of a user application. For instance, if a vibration were needed, an acceleration command could be issued to the LRA 110 (e.g., accelerate to resonance and then vibrate at for 1 second at resonant frequency). At the end of the vibration, a braking command could be issued by the primary loop module 150 to stop movement of the LRA 110 as fast as possible. If no zero crossing events are detected in the BEMF signal 134 however, the flag from the monitor 130 activates the alternate cycle module 160 which operates in open loop mode to push the LRA 110 at a predetermined frequency. This can include pushing in one direction and then reversing the direction of the push which is referred to as commutating. An LRA register 170 can be employed to indicate the resonant frequency of the LRA 110 and thus notify the alternate cycle module 170 the frequency to push in one direction and then the other. Alternatively, the LRA register 170 could be a model number designator in which the resonant frequency for the LRA 110 is derived.

Under normal operating conditions, when the LRA 110 is functioning as desired, the BEMF signal 134 can be employed as closed loop feedback in which the primary loop module 150 utilizes to control movement of the LRA. This includes controlling how the LRA 110 accelerates and/or brakes with respect to commands issued from the primary loop module 150. Under extreme environmental conditions however, the BEMF signal 134 from the LRA 110 can be degraded and/or undetectable such that close-loop control is no longer possible. For example, under low temperatures the LRA 110 can become frozen such that when initially excited, the LRA does not move and hence, the BEMF signal 134 is not generated. Under high noise conditions in another example, it may not be possible to suitably detect the BEMF signal 134 (e.g., monitor zero crossings with respect to the BEMF). Under such examples where the BEMF signal 134 cannot be relied upon for closed loop control, the controller 120 can seamlessly switch to open loop control to enable movement of the LRA 110. In a frozen LRA example, the alternate cycle module 160 can deliver energy excitation pulses in the form of push commands to the LRA 110 at or near the resonant frequency of the LRA. The delivered energy can have the effect of unfreezing the LRA 110 and thus allow the LRA's motor action to occur. After movement begins, and the BEMF signal 134 begins to generate, the controller 120 can switch back to closed loop operations via indication of the flag from the monitor 130 and re-synchronize with the motion of the LRA 110 at its respective resonant frequency.

A problem seen in some LRA actuators is that it may not be easy to start moving them. This is a problem when determining the drive time of a first cycle (See e.g., methods described below) since if the first cycle is too long, the monitor 130 can miss the zero crossing event (e.g., if the BEMF initial zero crossing is very short). If driven for too short a time, the LRA 110 may not move at all. What sometimes happens in such a scenario is that the first push is too long and the first polarity check for zero crossing of the BEMF signal 134 is negative, therefore the controller 120 waits for a negative-to-positive zero crossing that leads to two pulses on the same direction condition. This problem is resolved by commutating the push during actuator acceleration.

This can be achieved in the following manner. Since it is already known in which direction the LRA 110 was pushed, the first check-polarity check by the monitor 130 can be skipped and thus monitoring of the BEMF signal 134 can begin waiting for a zero-crossing event. If the BEMF signal 134 value is already in the opposite direction, that means that the zero-crossing already occurred, and therefore the controller 120 should push in the opposite direction (e.g., commutate) in the anticipation of detecting the next zero-crossing. The process of zero-cross detecting can be repeated until synchronization is achieved. If no zero-crossing events are detected by the detector 140 and indicated by counter value 144, the alternate cycle module 160 can begin to generate excitation push pulses (e.g., alternating between pushing in one direction and then the other at a predetermined frequency). The alternate cycle module 160 can employ two types of push (See e.g., FIGS. 3 and 4). These include an immediate-push that makes the decision to immediately push the LRA 110 when it has determined that it missed the zero-crossing. This provides the benefit of locking "faster" to the LRA 110 in the case the settings provided are wrong. However, this can cause the alternate-cycle driving frequency to be slightly higher than the LRA resonant frequency.

Figure 7:
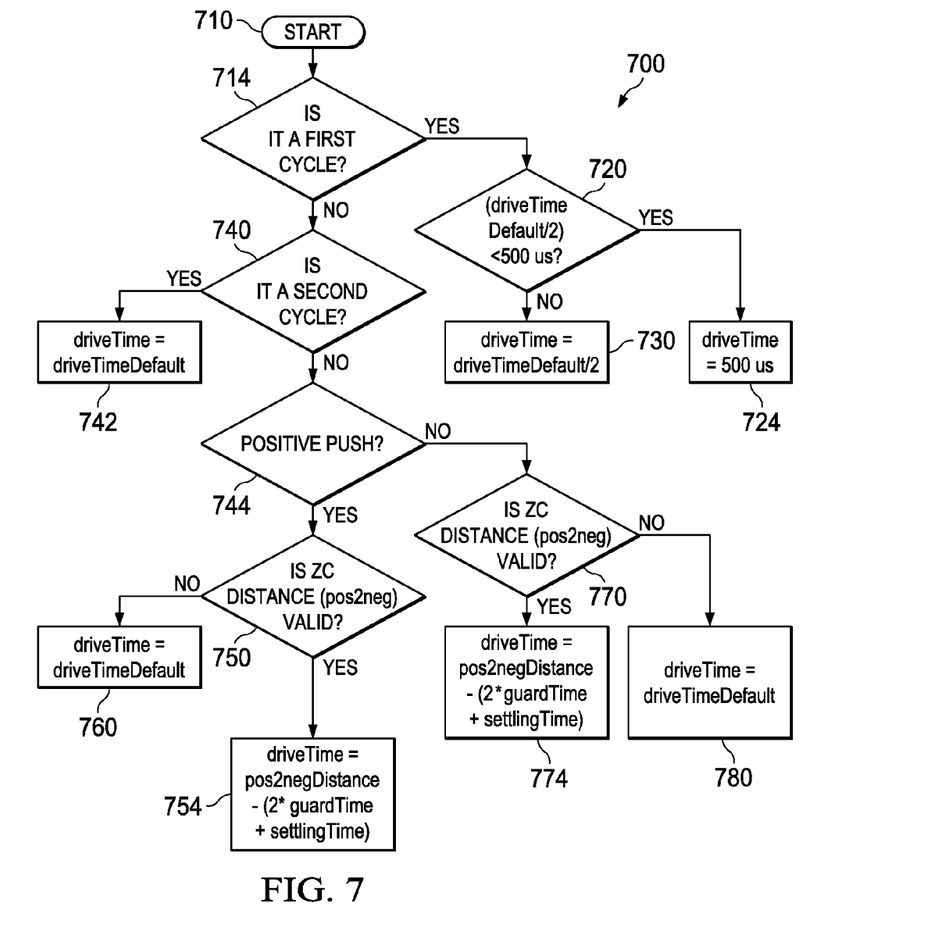
FIG. 7 illustrates an example method to determine drive time for a linear resonant actuator (LRA).

A centered-push waits for a guard-time before making the alternate-cycle push. A benefit of this approach is that the alternate-cycle pushes are almost indistinguishable from the resonant pushes, and they happen at a frequency that is close to the resonance frequency of the LRA 110. A "noise margin" (See e.g., FIG. 5) can be used to analyze the BEMF signal 134. This mitigates the need of an open-loop transition in the event an LRA actuator becomes frozen, since the controller 120 can push in a frequency close to the LRA 110 resonance frequency, and when the LRA begins to move, the controller 120 can lock to its resonance frequency and continue driving the LRA 110 in close-loop mode. The drive-time for each pulse generated to the LRA 110 can be determined for each mode of operation of the LRA 110 (e.g., initial push, closed loop mode, open-loop alternate cycle mode). The calculation can change depending on which mode is being used. FIG. 7 illustrates an example of how the drive-time can be calculated in each of the modes.

Figure 2:
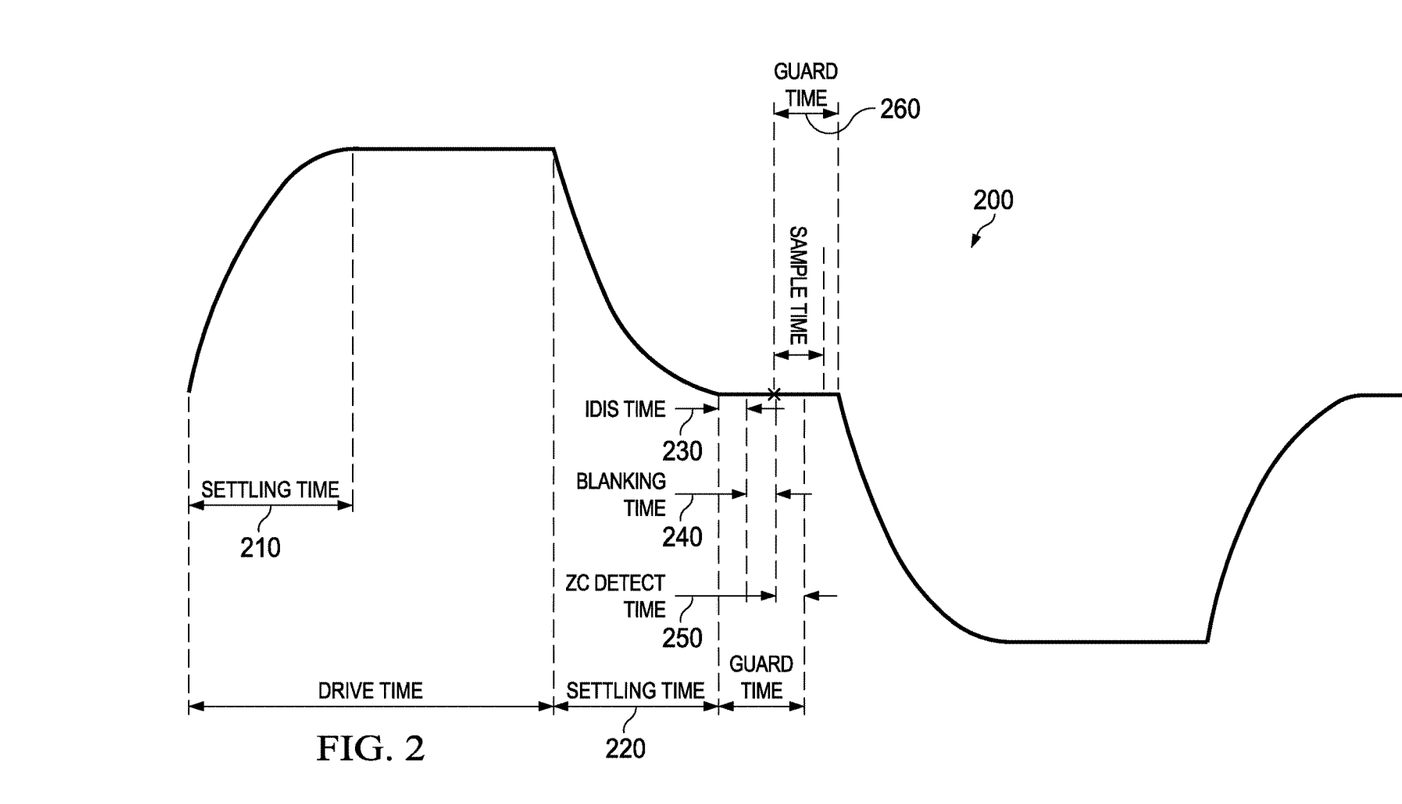
FIG. 2 illustrates an example of a drive waveform 200 that can be to push an LRA.

FIG. 2 illustrates an example of a drive waveform 200 that can be used to push an LRA. When the LRA is moving, it produces a BEMF voltage that is proportional to the velocity of the movement of the mass. In this example, to properly sense the BEMF voltage, the controller can stop driving the LRA and proceed to high impedance mode and/or monitor the LRA's current to extract the BEMF signal. In the waveform 200, the LRA drive time is illustrated having a first settling time 210 and a second settling time 220. Since the LRA inductor is charged, inductor artifacts are observed until the inductor becomes discharged. Since the discharge time may be significant, it may not be possible to sample the BEMF in time to extract useful information. For that reason, the LRA is forcibly discharged by grounding the inductor at its terminal for a period of time before proceeding to high impedance. This time is referred to as current dissipation time or idis time for short shown at 230.

After transitioning from grounding to high impedance mode, the inductor is now charged in the opposite direction and the controller waits some time for it to discharge before sampling the BEMF to extract information. This time is referred to as blanking time shown at 240. As shown, during the first settling time 210, the system has a settle-time before the voltage actually reaches the desired voltage and then it stays there for the drive-time. After the drive-time, the LRA is grounded to discharge the inductor (it takes settle-time plus idis-time). After the inductor current has been dissipated, the driver goes into high impedance mode and the controller waits during blanking time to discharge the inductor. After this time, a zero crossing time 250 is employed to wait for the zero crossing event to occur. After the zero-crossing is detected, the controller waits for sample-time at 260 and then measures the voltage of the BEMF. This information can be used to determine how strong the next push is going to be. Then, the controller waits for a period of guard time minus the sample-time before pushing again.

Figure 3:
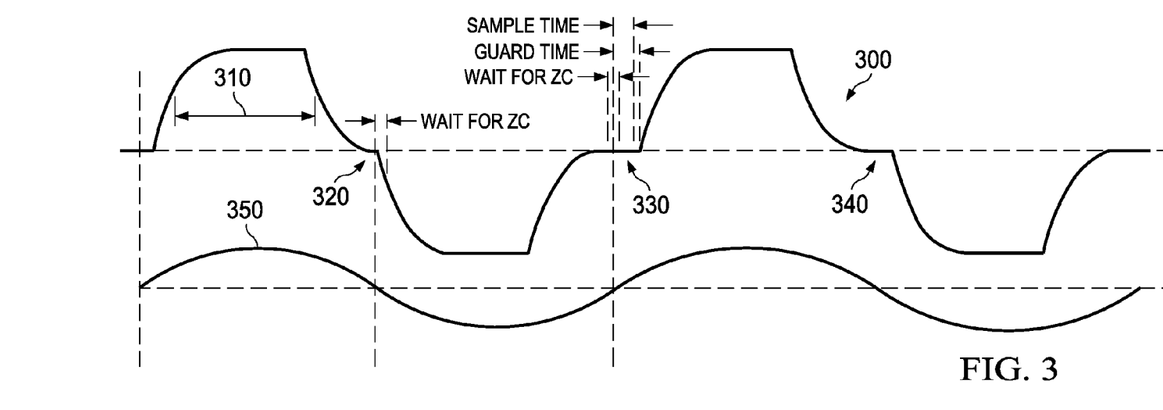
FIG. 3 illustrates an example of an immediate push to move an LRA in open loop mode.

FIG. 3 illustrates an example of an immediate push to move an LRA in open loop mode. In this example, a drive waveform 300 is shown pushing in a first direction at 310 and then after this time, immediately pushing in the opposite direction. When the cycle is repeated, a delay is initiated at 330 and 340 proceeding thereafter each cycle. The delay includes a period to wait for a zero cross detect, a sample time and an additional guard time, for example. If detected, a sample BEMF signal is illustrated at 350.

Figure 4:
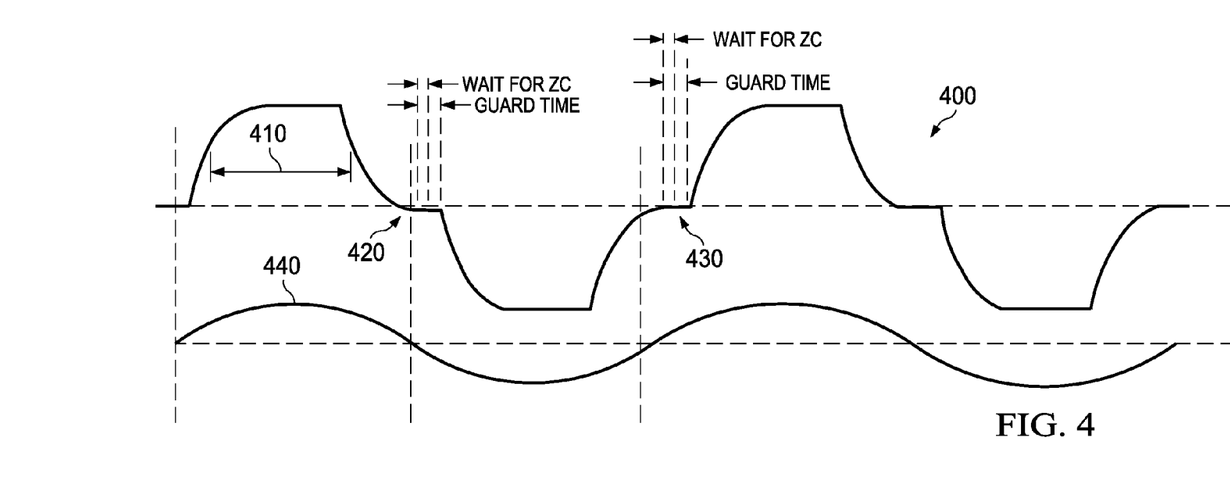
FIG. 4 illustrates an example of a centered-push to move an LRA in open loop mode.

FIG. 4 illustrates an example of a centered-push to move an LRA in open loop mode. In this example, a drive waveform 400 is shown pushing in a first direction at 410 and then after a delay at 420, pushing in the opposite direction. When the cycle is repeated, the delay is initiated at 430 and proceeding thereafter each cycle. The delay includes a period to wait for a zero cross detect and an additional guard time, for example. If detected, a sample BEMF signal is illustrated at 440.

Figure 5:
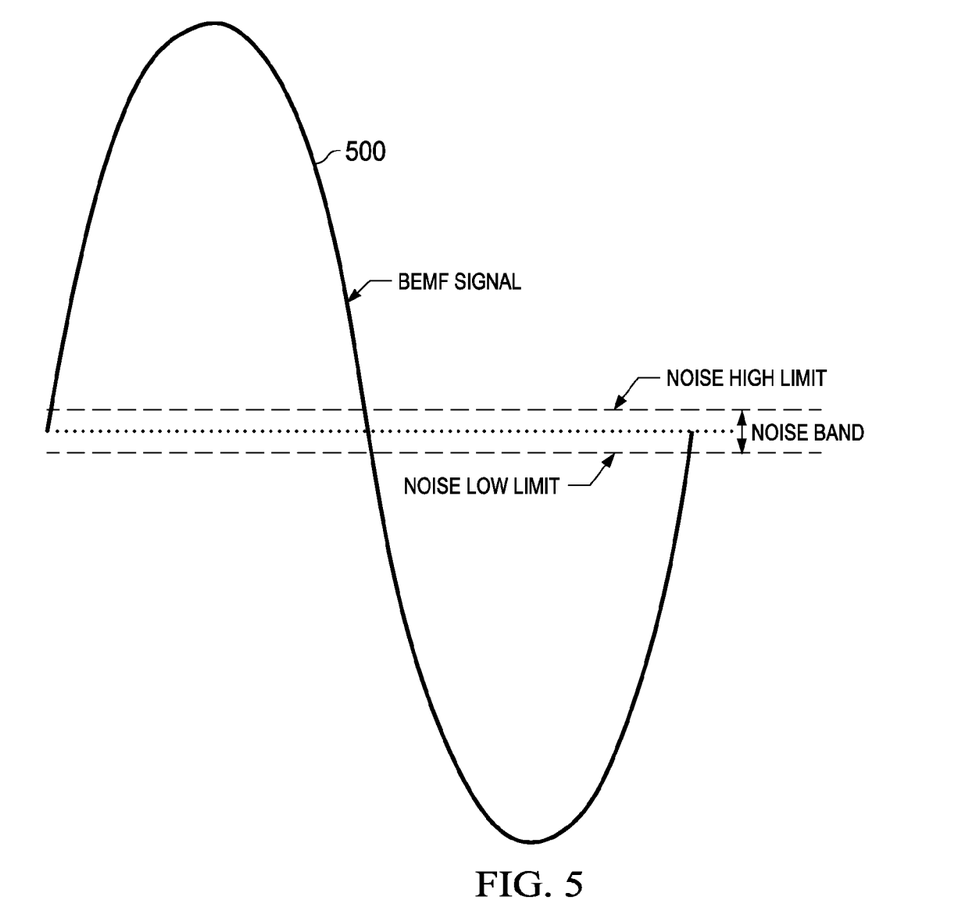
FIG. 5 illustrates an example of a BEMF signal where a noise band is employed to analyze the signal.

FIG. 5 illustrates an example of a BEMF signal 500 where a noise band is employed to analyze the signal. The noise band is provided to provide a boundary threshold for detecting zero crossing events described herein. This threshold includes a high noise limit and a low noise limit as illustrated that are situated a predetermined distance from the actual zero crossing of the BEMF signal. By utilizing such noise limits or thresholds, zero crossing events can be reliably detected (or not detected in the case of frozen LRA) to facilitate determination of open loop or closed loop operations of the controller.

In view of the foregoing structural and functional features described above, a method will be better appreciated with reference to FIGS. 6 through 10. While, for purposes of simplicity of explanation, the methods are shown and described as executing serially, it is to be understood and appreciated that the methods are not limited by the illustrated order, as some aspects could, in other examples, occur in different orders and/or concurrently with other aspects from that shown and described herein. Moreover, not all illustrated features may be required to implement a method. The various acts of the methods can be executed automatically such as via a processor, computer, and/or controller configured with executable instructions to carry out the various acts or commands described herein.

Figure 6:
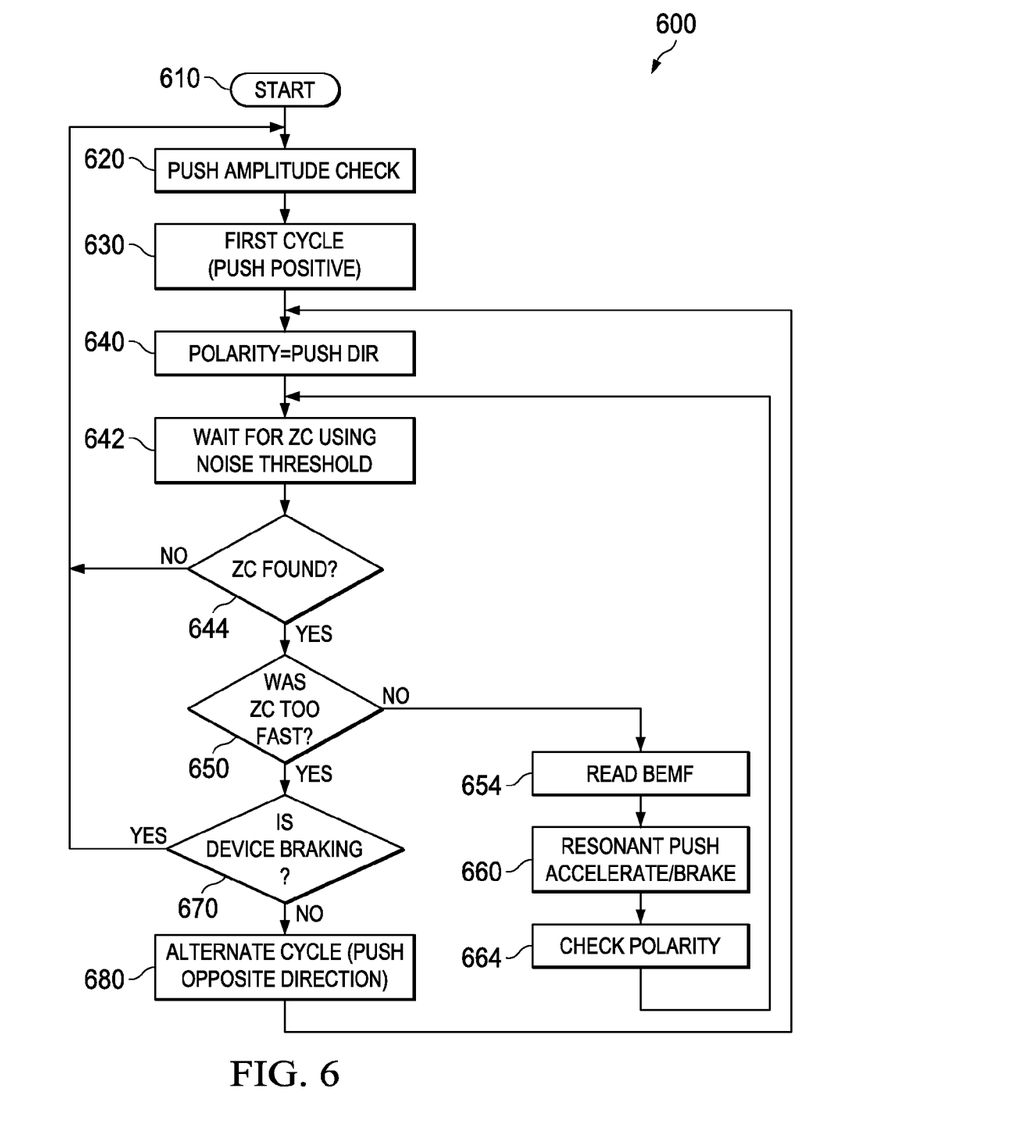
FIG. 6 illustrates an example of a method to control a linear resonant actuator (LRA).

FIG. 6 illustrates an example of a method 600 to control a linear resonant actuator (LRA). The method 600 begins at 610 and proceeds to a push amplitude check (See e.g., FIG. 9) at 620. At 630, a first cycle includes pushing the LRA in a positive direction although, the first cycle could include pushing in the negative direction in an alternative example. At 640, a polarity flag is set which is reflective of the push direction (e.g., flag equals 1 for positive and 0 for negative). At 642, the method 600 includes waiting for a zero crossing event to occur utilizing a noise threshold such as previously described with respect to FIG. 5. At 644, the method 600 determines whether or not a zero crossing event was detected. If not, the method 600 proceeds back to 620.

If a zero crossing was detected at 644, the method 600 proceeds to 650 to determine if the zero crossing event happened too fast (e.g., happened before predetermined waiting time). If the zero crossing event did not occur too early at 644, the method 600 proceeds to operate in a closed loop manner and proceeds to 654 to read BEMF. At 660, a resonant push occurs to cause acceleration or braking of the LRA to occur. A polarity check at 664 determines the direction of the BEMF signal wherein the method 600 then proceeds back to 642 to continue close loop operations.

If a zero crossing was determined to be too fast at 650, a determination is made at as to whether or not the LRA was braking. If braking was detected at 670, the method proceeds back to 620. If the LRA was not braking at 670, an alternate cycle is executed at 680. Each time the alternate cycle is executed, a push is applied in the opposite direction than was previous applied utilizing the polarity flag set at 640.

FIG. 7 illustrates an example method 700 to determine drive time for a linear resonant actuator (LRA). The method 700 begins at 710 and determines if a first cycle operation has commenced at 714. If a first cycle is determined at 714, the method proceeds to determine if a drive time default value divided by two is less than a predetermined time at 720 (e.g., 500 us). If the default value is less than the predetermined time, the method sets the drive time at the predetermined time at 724 (e.g., 500 us). If greater than the predetermined time at 714, the method sets the drive time default divided by two at 730.

If a first cycle operation is not determined at 714, the method proceeds to determine if an alternate cycle is initiated at 740. If an alternate cycle is determined valid, the method proceeds to 742 and sets the drive time to a default value. If the second cycle is not determined valid at 740, the method proceeds to 744. At 744, the method determines whether a positive push had been initiated. If so, the method proceeds to 750 to determine if the zero crossing distance going from positive to negative is valid. If so, the method proceeds to 754 and sets the drive time equal to the positive to negative distance—two times the guard time plus a settling time. If not valid at 750, the method sets the drive time to the default time at 760.

If a positive push was not determined positive at 744, the method proceeds to 770 to determine if the zero crossing distance going from negative to positive is valid. If so, the method proceeds to 774 and sets the drive time equal to the positive to negative distance—two times the guard time plus a settling time. If not valid at 770, the method sets the drive time to the default time at 780.

Figure 8:
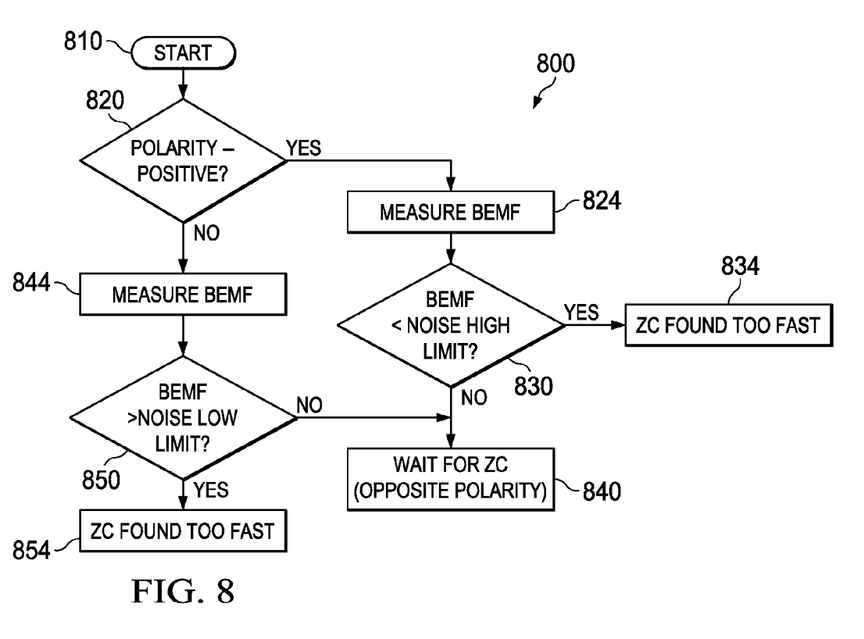
FIG. 8 illustrates an example method to detect zero crossing events for a linear resonant actuator (LRA) utilizing noise thresholds.

FIG. 8 illustrates an example method 800 to detect zero crossing events for a linear resonant actuator (LRA) utilizing noise thresholds. The method starts at 810 and proceeds to 820 to determine if the push polarity is positive. If so, the method proceeds to 824 and measures BEMF. At 830, the method determines if the BEMF signal is less than a high noise limit. If so, a zero crossing flag is set indicating the zero crossing happened too fast at 834. If the determination at 830 is not true, the method proceeds to 840 and waits for a zero crossing event having an opposite polarity.

If the push polarity at 820 was negative, the method proceeds to 844 to measure the BEMF signal. If the BEMF signal is greater than the noise low limit at 850, the method proceeds to 854 and sets a flag that the zero crossing event happened too fast. If the determination at 850 is not true, the method proceeds to 840 and waits for a zero crossing event having an opposite polarity.

Figure 9:
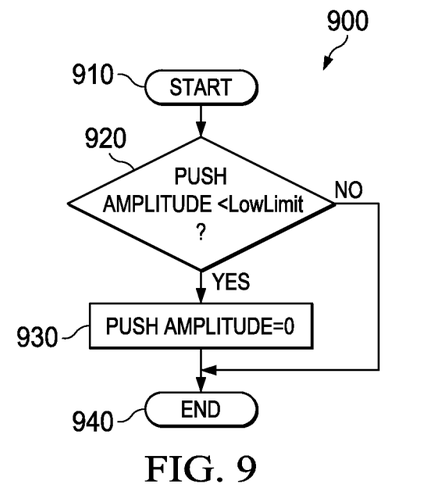
FIG. 9 illustrates an example method for a push amplitude check for a linear resonant actuator (LRA).

FIG. 9 illustrates an example method 900 for a push amplitude check for a linear resonant actuator (LRA). The method 900 begins at 910 and proceeds to 920 to determine if a push amplitude is less than a predetermined threshold limit. If so, the method sets the push amplitude to zero at 930. If the push amplitude greater than the low limit at 920, the method ends at 940.

Figure 10:
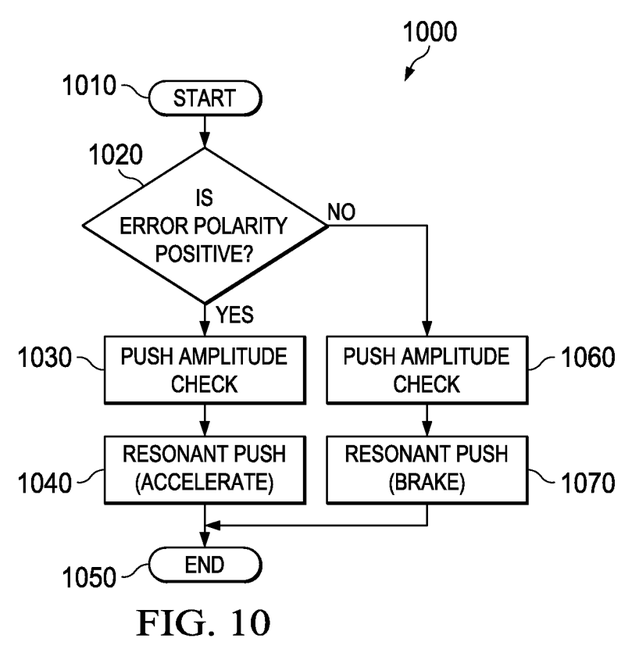
FIG. 10 illustrates an example method to generate a resonant push for a linear resonant actuator (LRA).

FIG. 10 illustrates an example method 1000 to generate a resonant push for a linear resonant actuator (LRA). The method 1000 begins at 1010 and proceeds to 1020 to determine if a controller error signal polarity is positive. If so, the method proceeds to 1030 and performs a push amplitude check followed by a resonant push acceleration command at 1040 before ending at 1050. If the error signal polarity is negative at 1020, a push amplitude check is performed at 1060 followed by a resonant push braking command at 1070 before ending at 1050.

Figure 11:
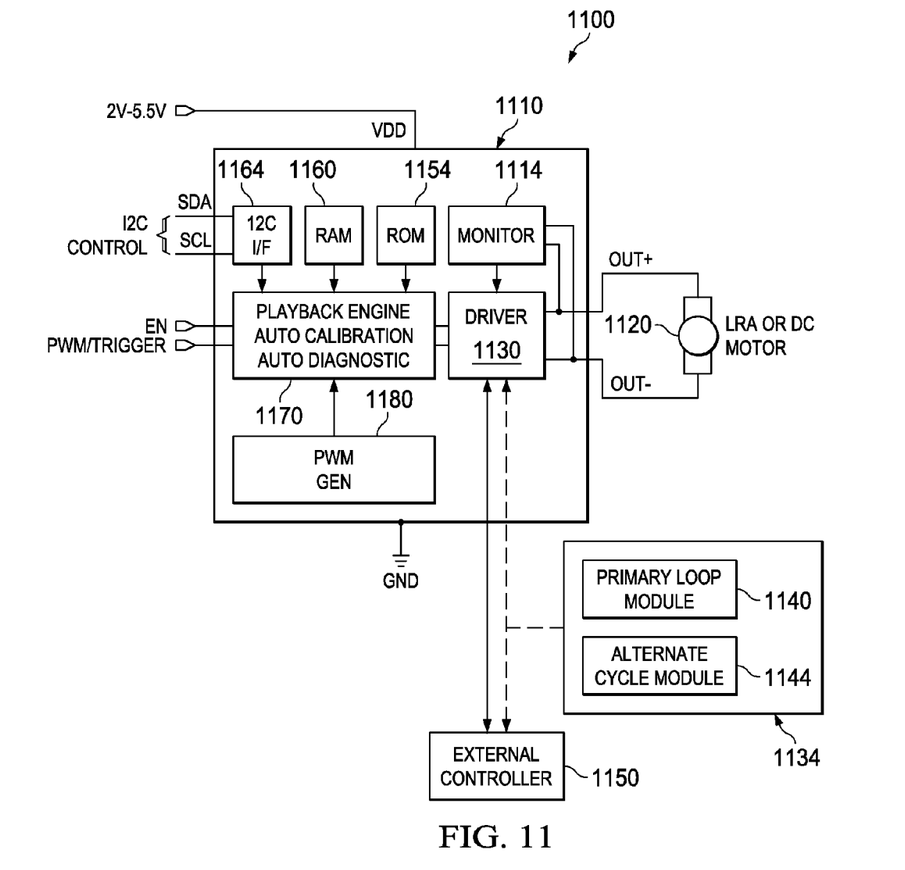
FIG. 11 illustrates an example of an integrated circuit driver and system to control a linear resonant actuator (LRA).

FIG. 11 illustrates an example of an integrated circuit driver and system 1100 to control a linear resonant actuator (LRA). An integrated circuit 110 includes a monitor 1114 to monitor a back electromotive force (BEMF) signal from a linear resonant actuator (LRA) 1120. The monitor 1114 generates a flag that indicates whether or not movement of the LRA 1120 has occurred. A driver 1130 generates an output signal to accelerate or brake the LRA 120. In one example, an instruction set 1134 can include executable instructions. The executable instructions can include a primary loop module 1140 to command the driver to control acceleration and braking of the LRA 1120 based on the monitored BEMF signal if the flag from the monitor 114 indicates that LRA movement has occurred.

An alternate cycle module 1144 commands the driver to push the LRA 1120 at a predetermined frequency if the flag from the monitor 1114 indicates that LRA movement has not occurred. The push is employed to move the LRA 1120 when the BEMF signal is undetectable by the monitor 1114. In one example, the primary loop module 1140 and/or the alternate cycle module 1144 can reside in the driver 1130. In an alternative example, the primary loop module 1140 and/or the alternate cycle module 1144 can reside in an external controller 1150 that communicates with the driver to control the LRA. Other components of the integrated circuit 1110 can include read only memory, random access memory 1160, and a serial bus interface 1164. An engine 1170 to command the driver 1130 can also be included. A PWM generator 1180 can be provided to operate the engine 1170.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
   a monitor coupled to detect a back electromotive force (BEMF) signal from a linear resonant actuator (LRA), the BEMF signal representing movement of the LRA, wherein the monitor is coupled to generate an indicator to: indicate that LRA movement has occurred, in response to the BEMF signal being detectable by the monitor with respect to a predetermined threshold; and indicate that LRA movement has not occurred, in response to the BEMF signal being undetectable by the monitor with respect to the predetermined threshold;
   a primary loop module coupled to control acceleration and braking of the LRA in a closed loop based on the detected BEMF signal, in response to the indicator from the monitor indicating that LRA movement has occurred; and an alternate cycle module coupled to push the LRA in an open loop at a predetermined frequency, in response to the indicator from the monitor indicating that LRA movement has not occurred, wherein the push includes both: a first push to push the LRA in a first direction; and, after the first push, a second push to push the LRA in a second direction opposite the first direction.

2. The system of claim 1, wherein the monitor is coupled to determine a direction and movement of the LRA based on zero crossings of the BEMF signal.

3. The system of claim 2, wherein the monitor is coupled to analyze a low limit threshold and a high limit threshold with respect to the BEMF signal to provide a noise margin for detecting the zero crossings of the BEMF signal.

4. The system of claim 1, wherein the monitor includes a counter to determine that LRA movement has not occurred, in response to the counter reaching a predetermined threshold number of missed zero crossing events.

5. The system of claim 1, wherein the first push is to push the LRA in the first direction during a drive time, and the second push is to push the LRA in the second direction immediately after the drive time.

6. The system of claim 1, wherein the first push is to push the LRA in the first direction during a drive time, and the second push is to push the LRA in the second direction following a predetermined waiting period after the drive time.

7. The system of claim 1, wherein the predetermined frequency is a resonant frequency of the LRA.

8. The system of claim 1, wherein the BEMF signal is undetectable by the monitor with respect to the predetermined threshold, in response to at least one of: the LRA being frozen due to temperature; and high noise conditions negating zero crossing detection of the LRA.

9. A method comprising:
detecting, by a monitor, a back electromotive force (BEMF) signal from a linear resonant actuator (LRA), the BEMF signal representing movement of the LRA;
determining that LRA movement has occurred, in response to the BEMF signal being detectable by the monitor with respect to a predetermined threshold;
determining that LRA movement has not occurred, in response to the BEMF signal being undetectable by the monitor with respect to the predetermined threshold;
controlling acceleration and braking of the LRA in a closed loop based on the detected BEMF signal, in response to determining that LRA movement has occurred; and
pushing the LRA in an open loop at a predetermined frequency, in response to determining that LRA movement has not occurred, wherein the pushing includes both: a first push to push the LRA in a first direction; and, after the first push, a second push to push the LRA in a second direction opposite the first direction.

10. The method of claim 9, further comprising:
determining a direction and movement of the LRA based on zero crossings of the BEMF signal.

11. The method of claim 10, further comprising:
analyzing a low limit threshold and a high limit threshold with respect to the BEMF signal to provide a noise margin for detecting the zero crossings of the BEMF signal.

12. The method of claim 9, wherein the first push is to push the LRA in the first direction during a drive time, and the second push is to push the LRA in the second direction immediately after the drive time.

13. The method of claim 9, wherein the first push is to push the LRA in the first direction during a drive time, and the second push is to push the LRA in the second direction following a predetermined waiting period after the drive time.

14. The method of claim 9, wherein determining that LRA movement has not occurred comprises:
determining that LRA movement has not occurred, in response to counting a predetermined threshold number of missed zero crossing events.

15. The method of claim 9, wherein the first push and the second push have different drive times.

16. The method of claim 9, further comprising initiating a resonant push command or a resonant brake command to the LRA based on an error signal.

17. The method of claim 9, wherein the predetermined frequency is a resonant frequency of the LRA.

18. An integrated circuit, comprising:
a monitor coupled to detect a back electromotive force (BEMF) signal from a linear resonant actuator (LRA), the BEMF signal representing movement of the LRA, wherein the monitor is coupled to generate an indicator to: indicate that LRA movement has occurred, in response to the BEMF signal being detectable by the monitor with respect to a predetermined threshold; and indicate that LRA movement has not occurred, in response to the BEMF signal being undetectable by the monitor with respect to the predetermined threshold;
a controller to generate an output signal to accelerate or brake the LRA;
a primary loop module coupled to command the controller to control acceleration and braking of the LRA in a closed loop based on the detected BEMF signal, in response to the indicator from the monitor indicating that LRA movement has occurred; and
an alternate cycle module coupled to command the controller to push the LRA in an open loop at a predetermined frequency, in response to the indicator from the monitor indicating that LRA movement has not occurred, wherein the push includes both: a first push to push the LRA in a first direction; and, after the first push, a second push to push the LRA in a second direction opposite the first direction.

19. The integrated circuit of claim 18, wherein the controller includes at least one of: the primary loop module; and the alternate cycle module.

20. The integrated circuit of claim 18, wherein the monitor includes a counter to determine that LRA movement has not occurred, in response to the counter reaching a predetermined threshold number of missed zero crossing events.

* * * * *